(12) United States Patent
Dykaar (10) Patent No.: US 6,904,198 B2
(45) Date of Patent: Jun. 7, 2005

(54) DEVICE FOR COUPLING LIGHT INTO THE FIBER

(76) Inventor: Douglas Raymond Dykaar, 465 Kingsford Place, Waterloo (CA), N2T 1K9

( * ) Notice: Subject to any disclaimer, the term of this patent is extended or adjusted under 35 U.S.C. 154(b) by 198 days.

(21) Appl. No.: 10/347,488

(22) Filed: Jan. 21, 2003

(65) Prior Publication Data

US 2004/0175074 A1 Sep. 9, 2004

Related U.S. Application Data

(60) Provisional application No. 60/350,757, filed on Jan. 22, 2002.

(51) Int. Cl.[7] ............................................. G20B 6/26
(52) U.S. Cl. ........................ 385/31; 385/27; 385/124
(58) Field of Search .............................. 385/12, 24, 27, 385/31, 37, 50, 123–128; 372/6, 96, 102

(56) References Cited

U.S. PATENT DOCUMENTS

| | | |
|---|---|---|
| 4,464,762 A | 8/1984 | Furuya |
| 4,658,403 A | 4/1987 | Takiguchi et al. |
| 4,794,615 A | 12/1988 | Berger et al. |
| 4,815,079 A | 3/1989 | Snitzer et al. |
| 4,856,017 A | 8/1989 | Ungar |
| 4,914,667 A | 4/1990 | Blonder et al. |
| 5,022,038 A | 6/1991 | Bradley |
| 5,022,042 A | 6/1991 | Bradley |
| 5,033,812 A | 7/1991 | Yoshida et al. |
| 5,123,070 A | 6/1992 | Bradley |
| 5,140,607 A | 8/1992 | Paiva |
| 5,243,676 A | 9/1993 | Bierlein et al. |
| 5,455,838 A | 10/1995 | Heritier et al. |
| 5,590,147 A | 12/1996 | Hobbs et al. |
| 5,594,747 A | 1/1997 | Ball |
| 5,619,369 A | 4/1997 | Yamamoto et al. |
| 5,621,749 A | 4/1997 | Baney |
| 5,623,508 A | 4/1997 | Grubb et al. |
| 5,647,038 A | 7/1997 | Minden et al. |
| 5,663,979 A | 9/1997 | Marshall et al. |
| 5,694,248 A | 12/1997 | Erdogan et al. |
| 5,712,715 A | 1/1998 | Erdogan et al. |
| 5,818,630 A | 10/1998 | Fermann et al. |
| 5,838,700 A | 11/1998 | Dianov et al. |
| 5,848,204 A | 12/1998 | Wanser |
| 5,999,673 A | 12/1999 | Valentin et al. |
| 6,490,388 B1 * | 12/2002 | Manzur ........................ 385/27 |

OTHER PUBLICATIONS

Weber et al. "Side–pumped fiber laser" Applied Physics B. Feb. 27, 1996.

Ma et al. "High–Performance Side–Polished Fibers and Applications as Liquid Crystal Clad Fiber Polarizers". Journal of Lightwave Technology IEEE, vol. 15, No. 8, Aug. 1997.

* cited by examiner

Primary Examiner—Phan T. H. Palmer
(74) Attorney, Agent, or Firm—Teitelbaum & MacLean; Neil Teitelbaum; Doug MacLean (57) ABSTRACT

An optical source is provided to the side of a fiber. The fiber is a single mode fiber which has a core and a cladding. The Bragg grating is written into the core at a low angle. Light emitted from the optical source is index-match coupled into the cladding by using an index matched element. Then, light is coupled into the fiber core along its length.

13 Claims, 14 Drawing Sheets

DEVICE FOR COUPLING LIGHT INTO THE FIBER

The present application claims the benefit of U.S. Provisional Patent Application Ser. No. 60/350,757 filed on Jan. 22, 2002, the contents of which are hereby incorporated by reference.

FIELD OF THE INVENTION

This invention relates to an optical fiber technology, and more particularly, to a device for coupling light into an optical fiber.

BACKGROUND OF THE INVENTION

Existing techniques for coupling light into an optical fiber introduces the light into the end of the fiber. This limits the area available for coupling light to what amounts to a point. The diameter of the point is typically less than 10 microns for single-mode fiber. Even in the case of cladding-pumped fibers, the diameter of the cladding is still only on the order of several hundred microns. In addition, some form of coupling optic is required to couple the laser emission into the fiber. This optic can be in the form of a discrete lens, or the lens may be formed onto the end of the fiber.

Figure 1A:
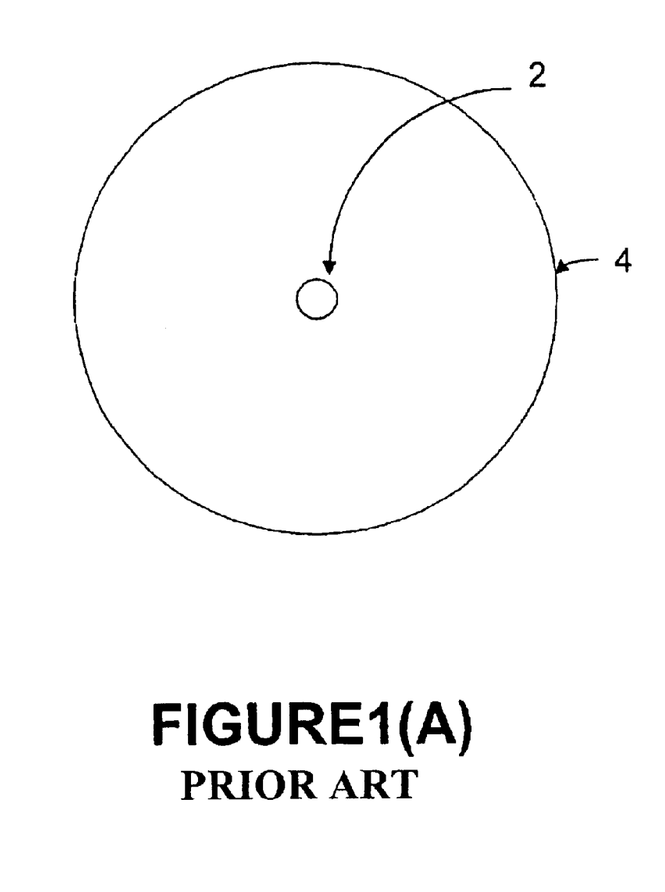
FIG. 1(A) is a schematic cross-sectional end view of a conventional fiber configuration.

FIGS. 1(A) and (B) show end views for existing fiber configurations. A fiber shown in FIG. 1(A) includes a core 2 and a cladding 4. A fiber shown in FIG. 1(B) includes a core 6, a secondary core (cladding) 8 and a cladding 10.

The index of the core 2 shown in FIG. 1(A) can be stepped with respect to the gladding or graded. However, the light that is coupled into a propagating mode in the fiber must satisfy the total internal reflection criteria of Snell's law. This limits the area over which light can be coupled to the approximate size of the core. Enlarging the core beyond this limit results in multi-mode propagation.

Figure 1B:
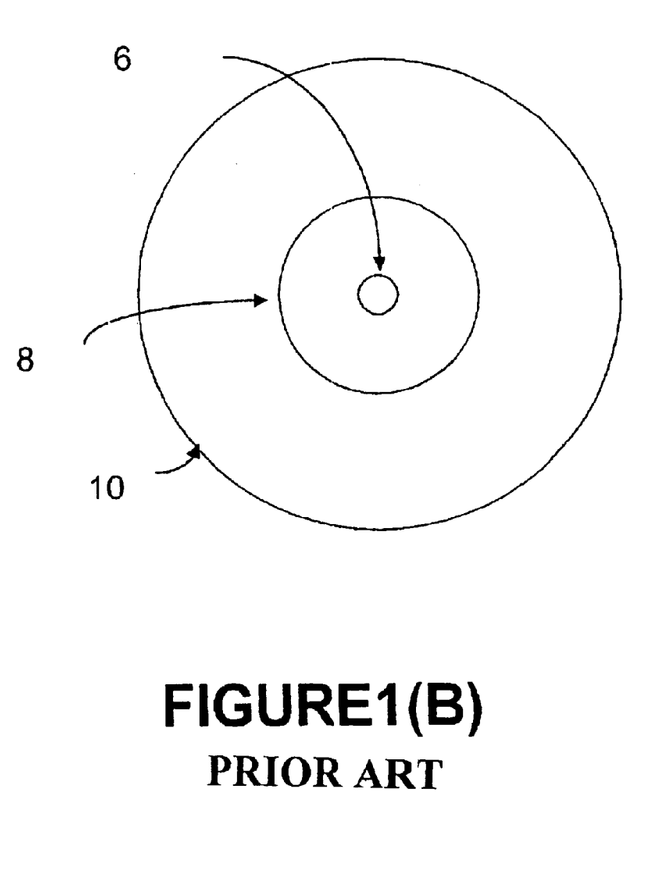
FIG. 1(B) is a schematic cross-sectional end view of another conventional fiber configuration.

In FIG. 1(B), the larger secondary core 8 is provided for propagating multimode pump light. The small diameter single-mode central core 6 is doped with atomic gain species, such as erbium. The pump light excites the gain species as it passes back and forth across the central core 6, converting light at the pump wavelength to light at gain species emission wavelength.

Both approaches place significant restrictions on the allowable optics and power levels that can be used. Typically, the damage threshold of the fiber-end surface limits the power that can be couple into the fiber.

The larger size of the multi-mode core allows a relatively larger diode pump array to be end-coupled onto the fiber. However, the pump laser is still limited to the area of the fiber cladding, which is typically less than 500 μm in diameter.

Fiber gratings have been available for several years. Conventionally, Side Tape Gratings (STG) and Long Period Gratings (LPG) have been used to couple light out of a fiber. For the STG, the angle at which the radiated light is coupled out of the fiber is:

$$\cos[\theta(\lambda)] = \frac{1}{n_{clad}}\left(\frac{\lambda}{\Delta_g} N\cos\theta_g - n_{eff}(\lambda)\right)$$

where, $n_{clad}$=Cladding Index;

$n_{eff}(\lambda)$=Effective index at wavelength, $\lambda$;

$\theta(\lambda)$=Wavelength dependent angle subtended by light radiated out of the core;

$\theta_g$=Grating period;

$\Delta_g$=Tilt of the grating with respect to the propagation direction; and

N=Order of the grating.

While these types of gratings are described as exemplary types of fiber gratings, the function they serve may be generated using other types of induced index change within the fiber to cause coupling of incident light along the length of the fiber to the core of the fiber. An example of such a structure is a regular pattern of notches along the length of the fiber, which, like a grating have a period as described in the above equation.

The approach described above has been used previously as a way to filter or reject unwanted light or to couple light out of a fiber to a power monitoring device.

It is, therefore, desirable to provide a new optical device that can couple light into an optical fiber to achieve higher coupled power.

SUMMARY OF THE INVENTION

It is an object of the invention to provide a novel optical device that obviates or mitigates at least one of the disadvantages of existing systems.

In accordance with an aspect of the present invention, there is provided a device including a single mode optical fiber having a core and a cladding. The core has a low angle, tilted grating. The device further includes an optical source, which is optically coupled to the fiber, for directing light through the side surface of the fiber so as to couple the light into the core.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 2:
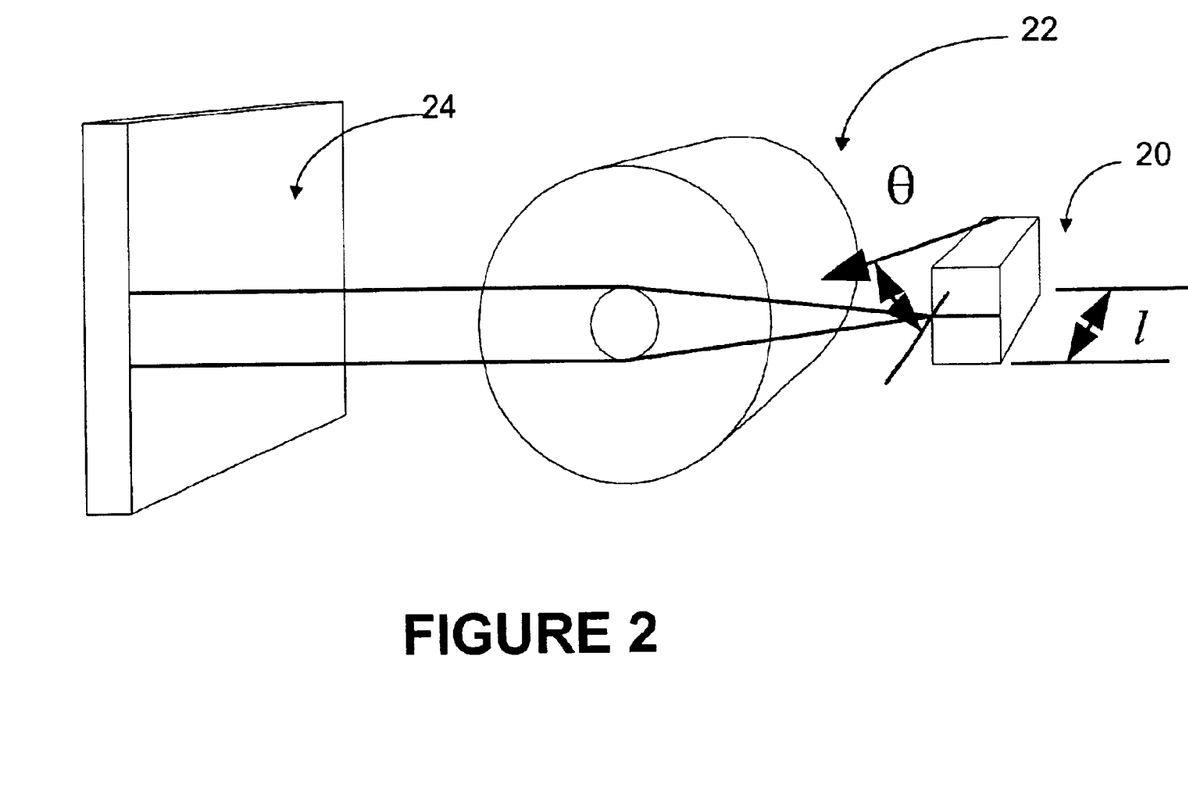
FIG. 2 is a schematic perspective view of a device for coupling light into a fiber in accordance with an embodiment of the present invention.

FIG. 2 shows a schematic perspective view of a device for coupling light into an optical fiber 22 in accordance with an embodiment of the present invention. The optical fiber 22 is a single-mode fiber and has a core and a cladding. The device shown in FIG. 2 includes a laser diode 20 of length "l", which is close coupled at an angle "θ" to a fiber grating formed within the core of the fiber 22. A mirror 24 or an alternative reflective optic may be provided to allow light, which is not coupled into the fiber, to be reflected back onto the grating. In the event the grating has sufficiently high reflectivity, the external mirror becomes unnecessary. The device of FIG. 2 may be a fiber laser.

"l" is the length of the laser stripe. "θ" is the angle at which the light is emitted, and is eventually matched to the fiber grating tilt angle. The laser emission angle may be different from the fiber tilt angle.

Figure 3:
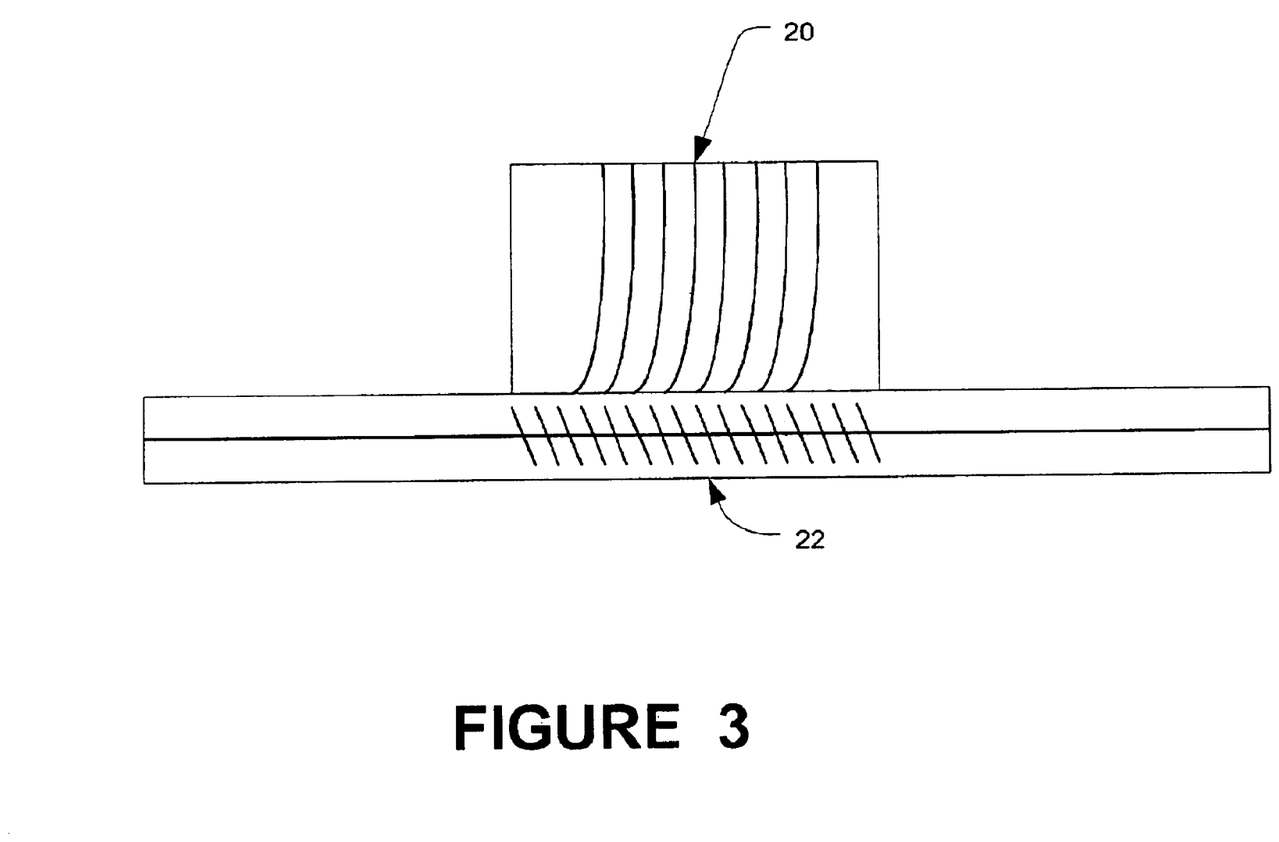
FIG. 3 is a schematic diagram showing one example of close-coupled arrangement of the optical source shown in FIG. 2.

FIG. 3 shows one example of close-coupled arrangement of the optical source 20 of FIG. 2. In FIG. 3, the laser (source) elements are perpendicular to the back surface to form (optionally coated) high reflectors at the rear of the optical source (20), and are curved at the output (possibly coated) to match the angle required by the tilted grating. The source can arranged to emit at near Brewster's angle for minimum loss. If the system is properly designed, no other optics would be required.

Light is coupled into the fiber 22 along its length, thus increasing the power so as to be effectively coupled into the fiber 22. This also simplifies the mechanical requirements on the coupling optics, as light can be distributed linearly along the length of the fiber, as opposed to being focused onto what amounts to a point on the cross-section of the fiber core. In addition, the distributed nature of the coupling tends to spatially average the noise present in the pump laser (i.e. laser diode 20), which is coupled into the fiber 22 from the pump laser 20.

Light is coupled into the fiber 22 using the grating formed within the fiber 22. The coupling is easy to implement in practice since the alignment is oriented along the length of the fiber 22, as opposed to the end (i.e. along a line versus a point).

In the fiber 22, a low-angle, tilted Bragg grating is used. Preferably, the grating is a Bragg grating written into the fiber 22 at less than about 20 degree with respect to the length of the fiber 22. The grating of the fiber 22 may be written to achieve high reflectivity, e.g. 100% reflectivity. The low-angle tilted-grating of the fiber 22 maximizes the coupling of light from the core to the cladding, or vice-versa.

Bragg gratings are formed in fibers using optical interference to create a region where intensity variations in the light interact with the glass of the fiber to change the index in regions of higher intensity. The interference is created by directly interfering two laser beams at an angle, or by using plus and minus diffraction orders from a phase mask. In all cases a range of factors determines the spatial extent of the interference region including optical element quality, mechanical stability, optical coherence length, etc. In order to obtain the tilt in the desired grating, the fiber is tilted in the interference region. As the fiber is tilted, the length of the fiber inside the interference region will be reduced. For a given grating writing arrangement, therefore, the maximum strength of grating will be obtained if the angle of the grating is kept small (e.g. less than 20 degree). The longer the physical extent of the grating, the larger the number of alternating regions high and low relative index in the grating region and the higher the effective coupling to the core.

The angled gratings are described in Kashyap R. "Fiber Bragg Gratings" Academic Press, NY, 1999, Chapter 3, Section 3.1.4, pp 69–71; "Novel and improved methods of writing Bragg gratings with phase masks," Othonos, A.; Xavier Lee, IEEE Photonics Technology Letters, (7) 10, October 1995, 1183–1185; and "Chirped fibre gratings produced by tilting the fibre," Chandonnet, A.; Lauzon, J.; Painchaud, Y., Electronics Letters, (31) 3, 2 Feb. 1995, 171–172.

The level of coupling achievable in conventional Bragg-gratings is in the few percent range. In the embodiment of the present invention, the grating is implemented in the fiber 22 so as to form the output coupler of a laser cavity, such that the strength of the grating is now of an appropriate value. That increases the coupling of light. In the simplest configuration, the laser diode 20 (or diode array), with a gain stripe angled relative the cleave plane, is close coupled to the grating shown in FIG. 2. This is in contrast to an end-coupled arrangement, wherein the axis of the light is preferably transverse to the cleaved end of the fiber.

Light is index-match coupled into the cladding of the fiber 22. Index matched coupling occurs when the coupling medium has essentially the same index as the cladding. In this way, light is brought from outside the fiber 22 directly to the core-cladding interface at the appropriate angle so as to couple the grating within the core. By minimizing the mechanical operations that the fiber 22 is subject to, risk of failure due to breakage is minimized.

The external configuration of the coupling optic allows light to direct from the optical gain medium to the grating such that the optical field pattern is optimally mapped onto the grating. There are many ways in which this can be achieved using standard combinations of optics, including lenses and gradient-index glass, as well as tailoring of the grating within the fiber to match a particular configuration. The tailoring can take the form of a chirp in the profile, or patterning of discrete sections to match discrete gain regions in a multiple stripe diode-gain element for example.

There are many examples of the coupling optics for coupling light out of fibers, such as Wagener, J. L., Strasser, T. A., Pedrazzini J. R., DeMarco J. and Giovani D. J. "Fiber Grating Optical Spectrum Analyzer Tap", ECOC-97, Sep. 22–25, 1997, Conference Publication No. 448, IEE, pp 65–68. Many of the coupling geometries, which are conventionally used between fibers and detectors, are applicable to the device in accordance with the embodiment of the present invention.

The grating of the fiber 22, the laser diode source 20 and the coupling optics are at sufficiently separated in wavelength so that the individual units do not interfere in multiple wavelength configurations. Coupling may be desirable, however, and can be designed for within the gain medium.

Figure 5:
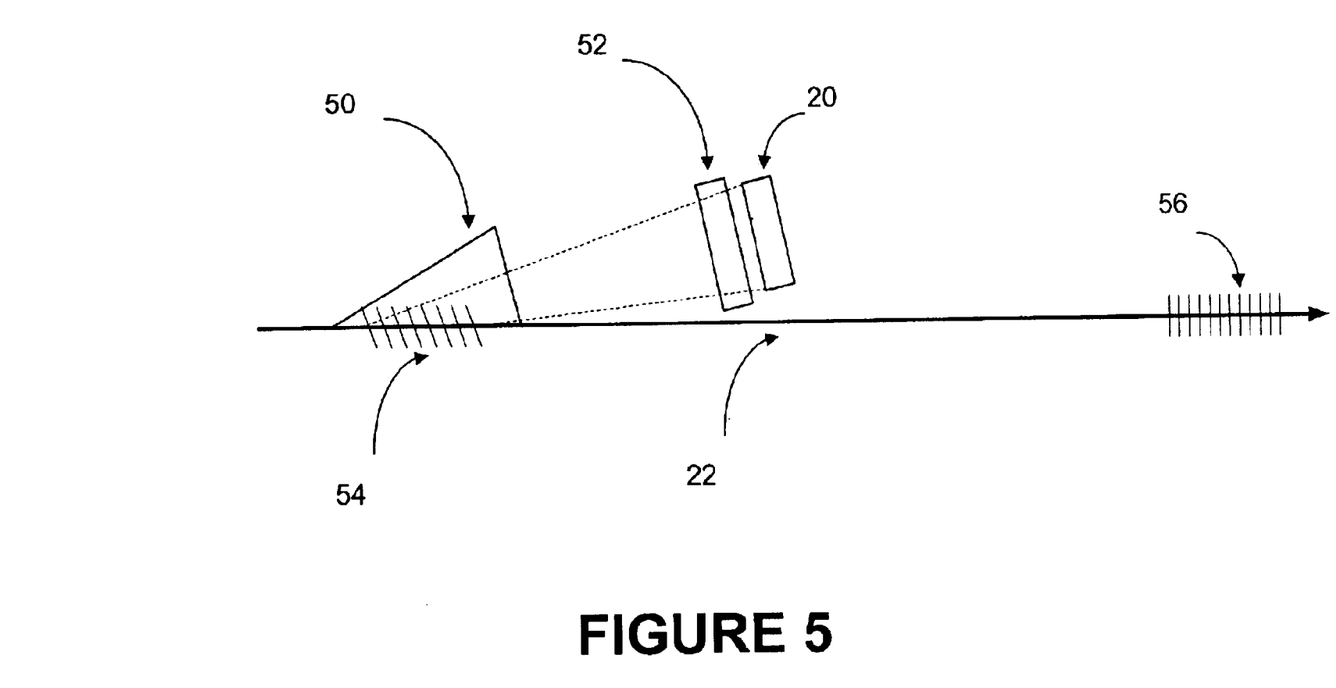
FIG. 5 is a schematic diagram showing one example of the device shown in FIG. 2.

In FIG. 2, the laser diode 20 is shown as an optical source. However, the source may be an array of laser diodes. The laser diode 20 may have single or multi-element. The laser diode 20 may be optically coupled of close-coupled to the grating (FIG. 3). The optical source (20) may be any type of a self-contained laser source, an extended cavity, or an extended cavity including the fiber and downstream fiber-grating output-coupler (FIG. 5). Multiple sources may be used to provide redundancy. Preferably, laser diode bars are used for their reliability. The laser diode source 20 may generate single or multi wavelengths. The laser diode 20 may output Continuous Wave (CW) or pulsed.

The fiber 22 may be a shaped fiber, e.g. either shaped cladding or core (such as "D" cladding or oval core profile). The shaped fiber reduces the possible extent of the grating within the cladding.

Figure 4:
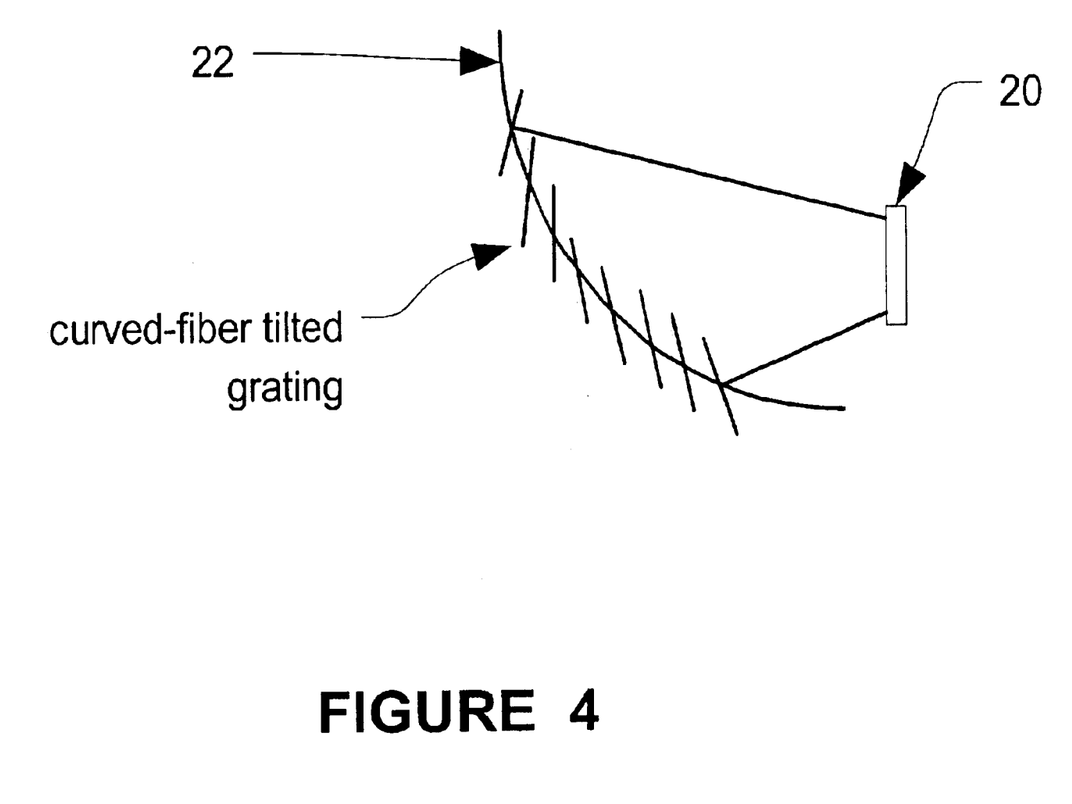
FIG. 4 is a schematic diagram showing a curved-fiber 22 of FIG. 2.

The fiber 22 may be a curved fiber as illustrated in FIG. 4. The curved fiber 22 of FIG. 4 has a tilted grating, which is curved so as to focus directly onto the optical source. For adjusting the focus, some lenses may be used.

FIG. 5 shows one example of the device shown in FIG. 2. In FIG. 5, the fiber 22 includes a grating 54 and a grating 56. The arrow illustrated in FIG. 5 shows a light flow (downstream) direction. The beam light from the laser diode source 20 is emitted to the grating 54. Leakage in the backward direction can be used to illuminate a power monitor (not shown).

The fiber 22 has a core of index n1 and a cladding of index n2(n1>n2:n2 may be stepped or graded-index). The fiber 22 may be doped or modified (e.g. hydrogen loaded) to facilitate grating production or doped or modified in other ways. The fiber 22 may be doped with gain material, such as Erbium, Ytterbium to form a laser amplifier. The fiber 22 may include a semiconductor gain medium to form a semiconductor laser.

The grating 54 is a side-tapped low angle high-reflectivity grating which is written in the core of the fiber 22.

The grating 56 serves as an output coupler and defines cavity if a laser diode is used in extended configuration. The grating 56 may also be tilted to couple light out the side in high power applications. The grating 56 may be chirped or multiple-discrete to generate multiple wavelengths.

An index matched coupling optic 50 with index n3 is provided to the fiber 22 such that light is index-match coupled into the cladding at the area of the grating 54. The index matched coupling optic 50 may be lens, mirror or prism, singly or in combination. The index matched coupling optic 50 is coupled to the fiber, using index matched material, such as glues, gels, oil, bonded or built up by deposition (partially or in total).

The index n3 of the coupling optic 50 is equal or greater than the index n1 of the core. The index n3 may be equal to the index n2 of the cladding.

The index matched coupling optic 50 may be placed, glued or held up to the polished flat spot of the. For example, the part of the cladding is removed by polishing it and is replaced with the index-matched material. The coupling optic 50 then optically couples the source light to the fiber through the index-matched material.

This allows cladding material that may have the grating written into it to be removed. The source may be coupled to the fiber 22 or free space coupled.

A focusing optic 52 may be provided to the source 20. The focusing optic 52 collects the output of the laser diode source 20, and focuses it into the side-tapped low-angle high-reflective grating 54. The focusing optic 52 may be integrated into the index matched coupling optic 50.

In FIG. 5, the device includes one source 20 for the fiber 22. However, the device may include more than one source for the fiber 22.

Figure 6:
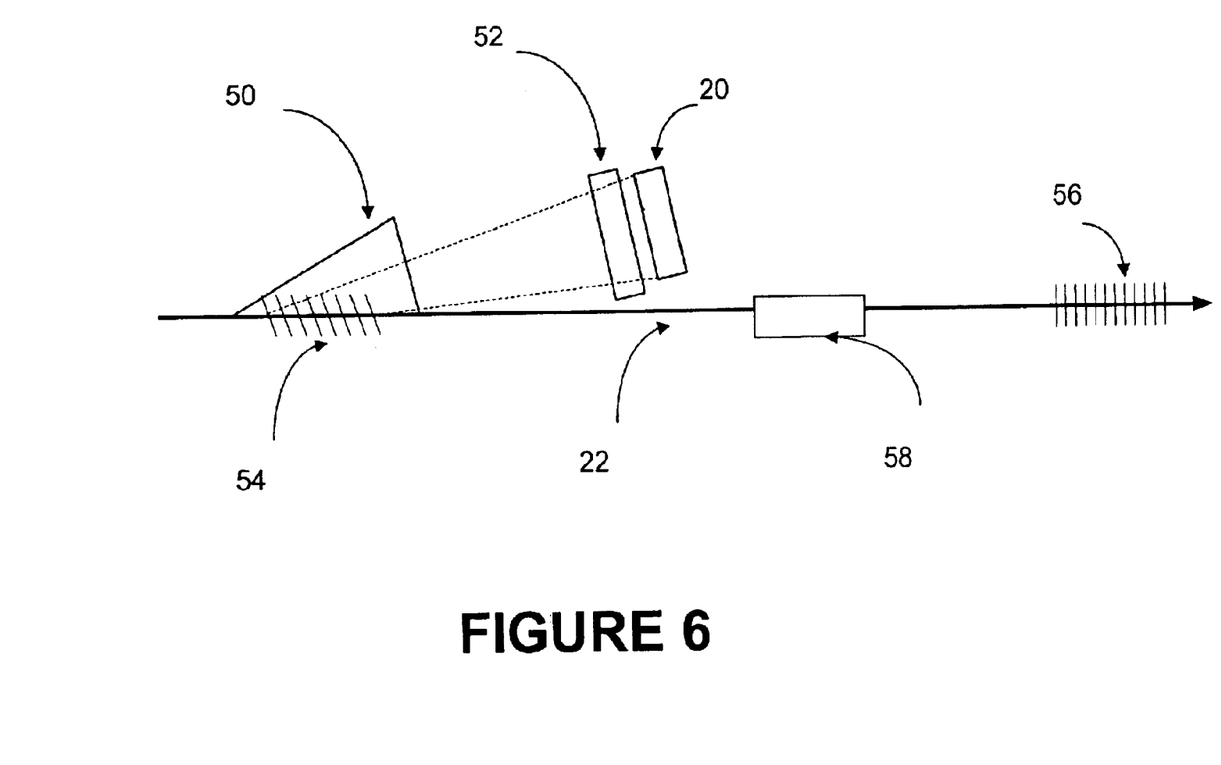
FIG. 6 is a schematic diagram showing the device of FIG. 5 with a filter.
Figure 7A:
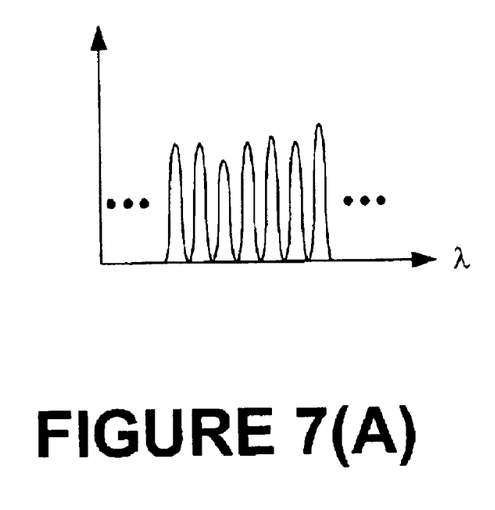
FIG. 7(A) is a graph showing one example of the feature of the filter shown in FIG. 6.

As illustrated in FIG. 6, the fiber 22 may includes a filter 58. The filter 58 may be an intra cavity filter or an extra-cavity filter. The filter 58 is a band pass filter. The filter 58 causes the signal to be discrete or channelized independent of the laser source 20. The filter has channel dependent amplitudes to match external amplifiers. Channel width on the filer 22 is changed with the filter 58 as shown in FIG. 7(A). The filter 58 may be an interleaver, which is a passive device having a feature shown in FIG. 7(A), that defines multiple wavelengths at desired wavelengths and spacing. For example, with many laser diode stripes defined, the filter is used to control the width of the individual channels. By changing the filter, channels widths can be easily changed.

Figure 7B:
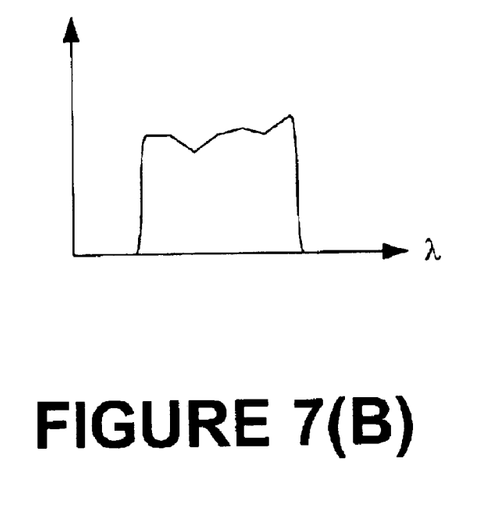
FIG. 7(B) is a graph showing anther example of the feature of the filter shown in FIG. 6.

The filter 58 may be a gain flattening filter as shown in FIG. 7(B). The gain-flattening filter is used to control amplitude so that external amplifier produces a flat amplitude in response to wavelength.

Figure 8A:
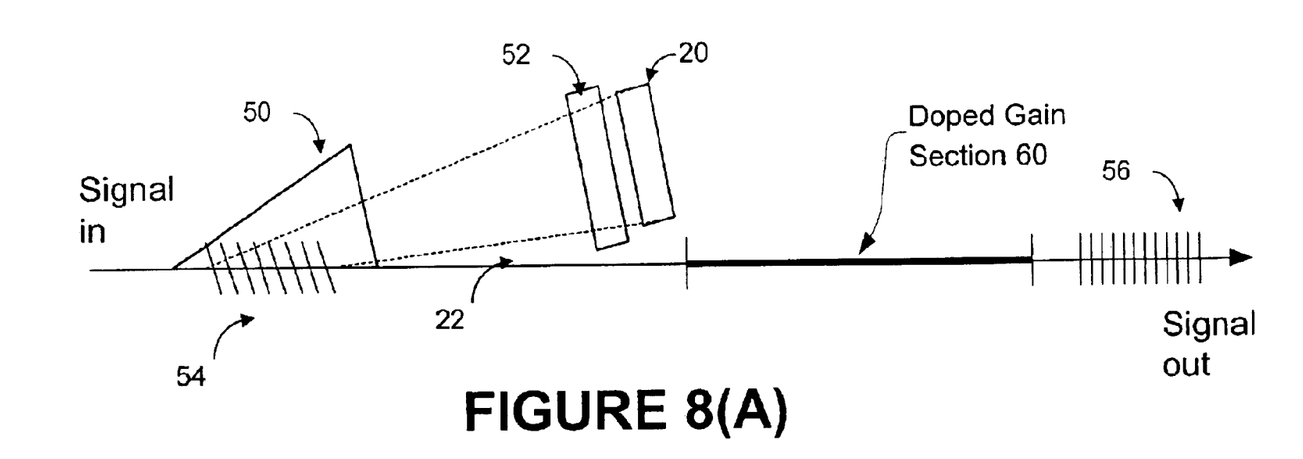
FIG. 8(A) is a schematic diagram showing an amplifier application based on the device of FIG. 6.
Figure 8B:
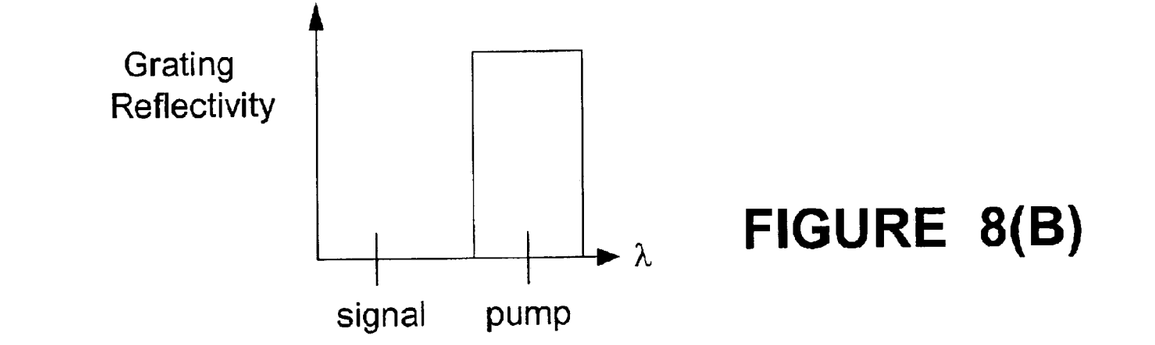
FIG. 8(B) is a graph showing one example of the feature of the amplifier shown in FIG. 8(A)

The device shown in FIG. 5 is applicable to an optical fiber amplifier. FIG. 8(A) shows an amplifier application based on the device of FIG. 6. The fiber 22 of FIG. 8(A) includes a rare-earth doped section 60 (an intra cavity element) where the rare-earth is inside the cavity region of the fiber 22. The section. 60 is located between the gratings 54 and 56. As illustrated in FIG. 8(B), the grating 56 reflects light at the pump wavelength. Signal input to the fiber 22 passes through the section 60. The pump wavelength may be visible, infra-red or ultra-violet. The gratings 54 and 56 are as close to 100% reflectivity as available. The doped intra cavity element with the gratings 54 and 56 provides higher pomp power for the amplifier.

Figure 9:
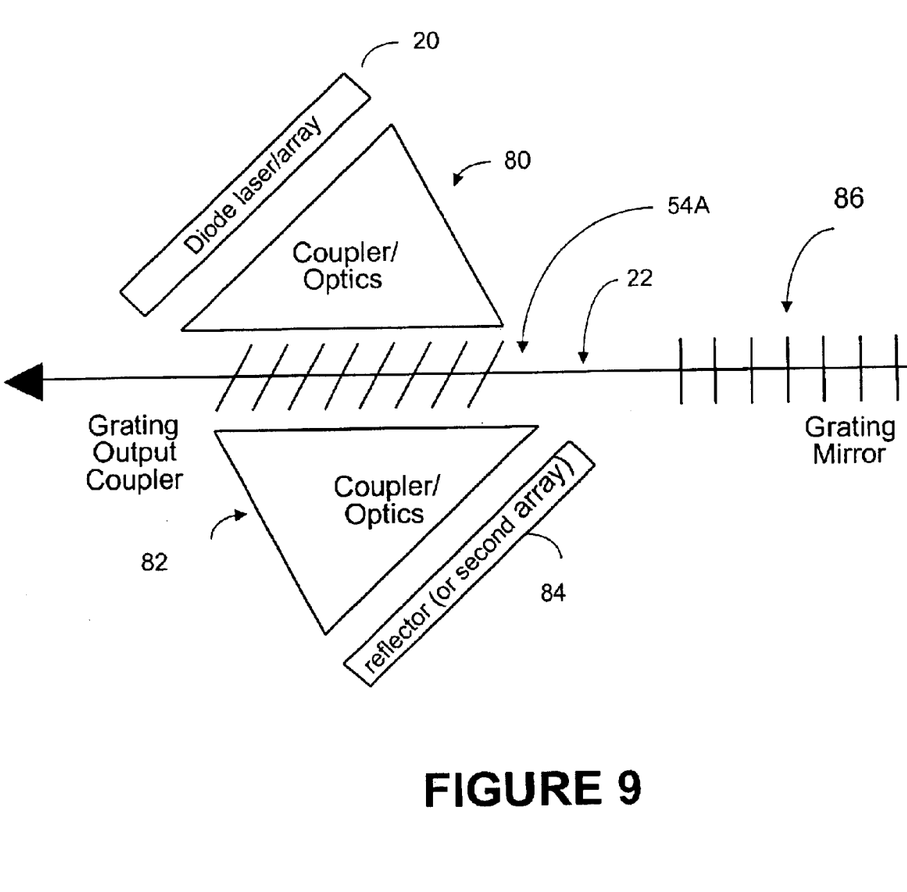
FIG. 9 is a schematic diagram showing a further example of the device shown in FIG. 2.

FIG. 9 shows a further example of the device shown in FIG. 2. In FIG. 8, a coupler/optics 80 is provided between a lower reflectivity tilted grating 54A and the optical source 20 (e.g. diode laser/array), and further a coupler/optics 82 is provided between the grating 54A and another optical source 84. The grating 54A is a low reflector. The optical source 84 may be a reflector or a second diode laser/array to provide light into the grating 54. The optical source 84 may be attached to the fiber 22 in the similar geometry and manner as the optical source 20. The fiber 22 of FIG. 8 further includes a standard fiber Bragg-grating 86 that acts as a mirror.

In the arrangement of FIG. 9, some light goes through the grating. The source on the opposite side is therefore part of the cavity defined by the two laser arrays 20 and 84. The tilted grating 54A acts as a bidirectional output coupler. The grating mirror 86 acts as a high reflector and reflects light back so that the output is unidirectional. The same arrangement may be used in a ring configuration, without the grating mirror 86.

Figure 10:
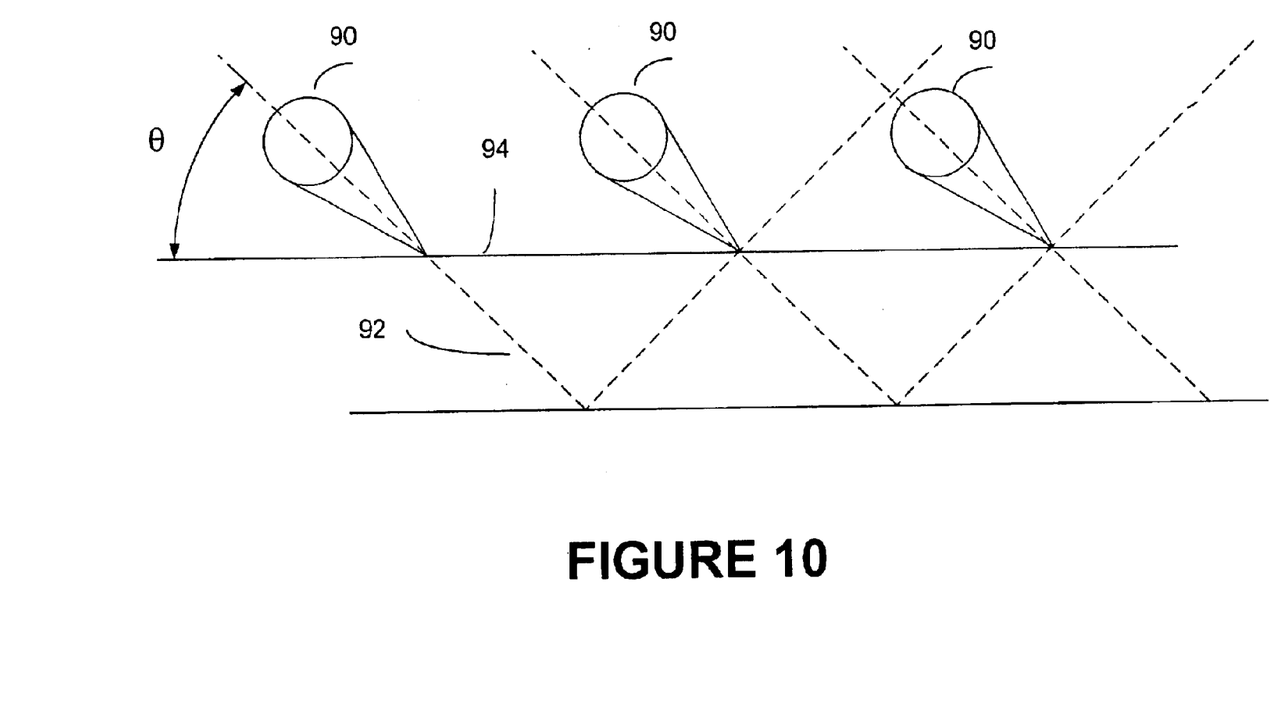
FIG. 10 is a schematic diagram showing a first example of the electrode pattern of the laser diode shown in FIG. 2.

FIG. 10 shows one example of the electrode pattern of the laser diode 20 shown in FIG. 2. In FIG. 10, an emission is illustrated by the numeral 90 and a electrode pattern is illustrated by the numeral 92. As shown in FIG. 10, the laser diode 20 may be fabricated or modified to emit light at an angle "θ" relative to the cleave plane. Although stray light will be reflected off the back surface 94 of the laser facet, an anti-reflection (AR) coating may be used to minimize this effect. Although the output facet is preferably at Brewster's angle to minimize reflections, an AR coating may be used to passivate the surface 94.

Figure 11A:
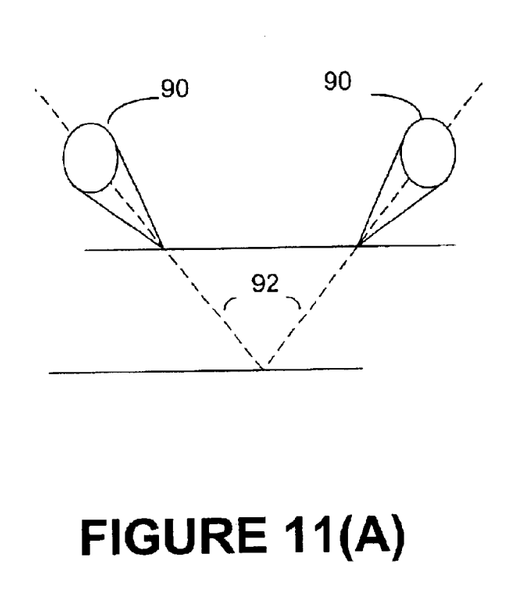
FIG. 11(A) is a schematic diagram showing a second example of the electrode pattern of the laser diode shown in FIG. 2.
Figure 11B:
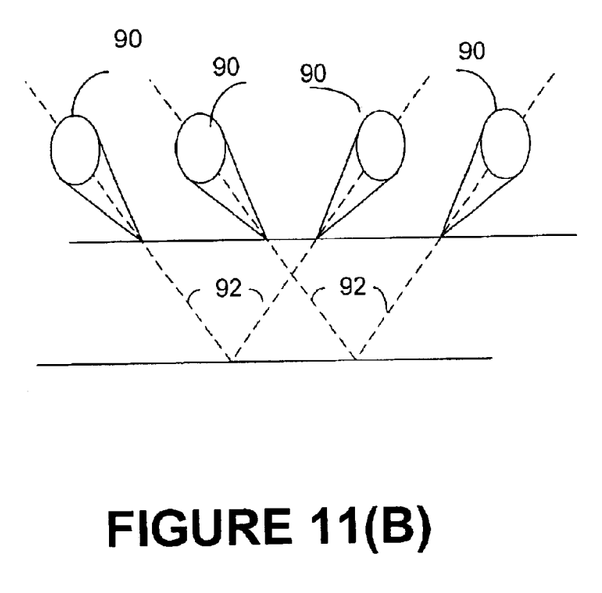
FIG. 11(B) is a schematic diagram showing a third example of the electrode pattern of the laser diode shown in FIG. 2.

FIGS. 11(A) and 11(B) show further examples of the laser diode 20 shown in FIG. 2. As shown in FIGS. 11(A) and 11(B), the electrode 92 may be applied in a "V" or "W" pattern to produce laser emission in two different directions. The emission is then coupled to the fiber 22 as described above.

Figure 12:
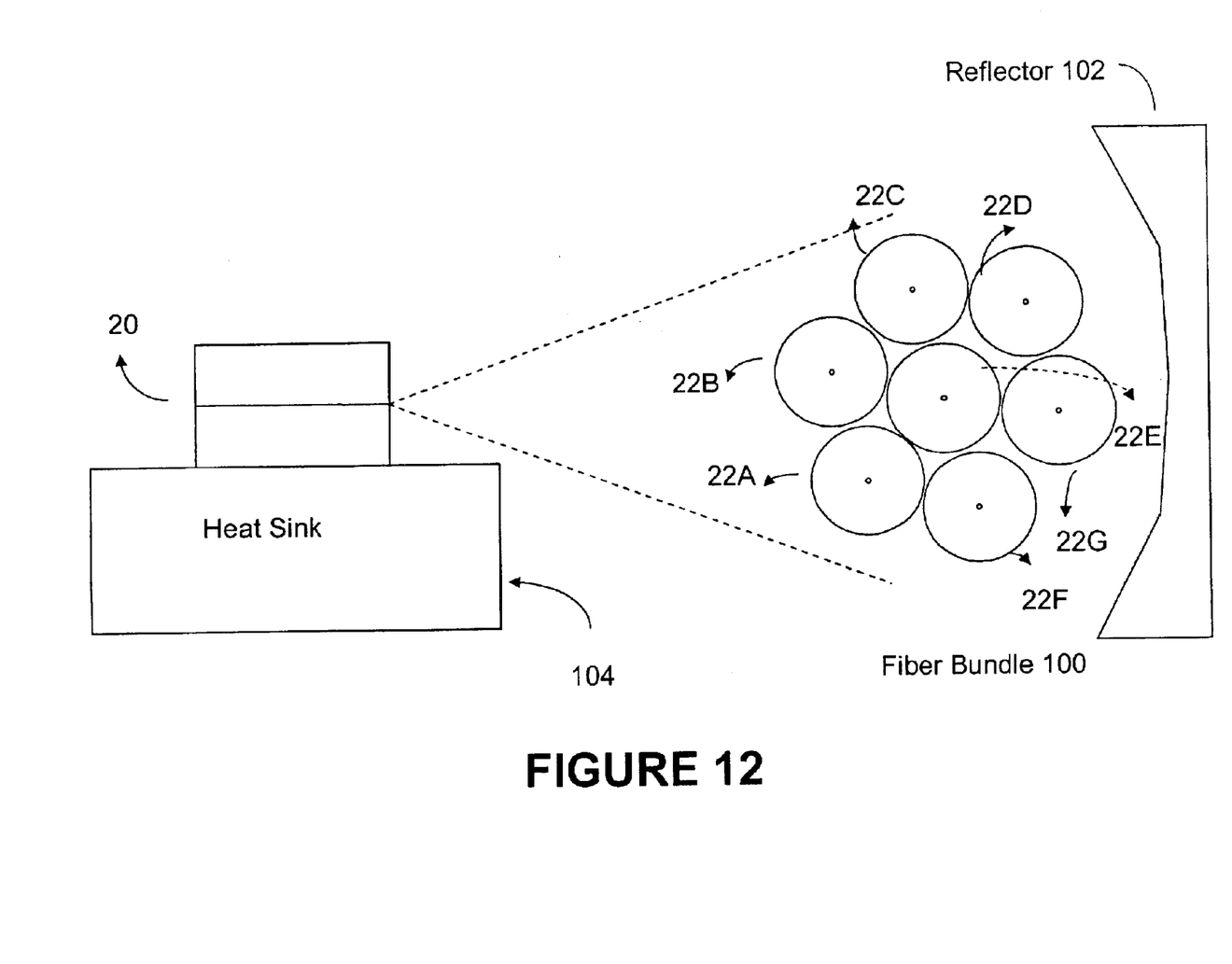
FIG. 12 is a schematic diagram showing the device of FIG. 2 with a fiber-bundle.

The single fiber 22 may be replaced by multiple fibers in a bundle 100 shown in FIG. 12. FIG. 12 shows a further example of the device shown in FIG. 2. The device shown in FIG. 12 includes the diode bar 20, the bundle 100, a reflector 102 and a heat sink 104. The coupling optic may be provided. It is noted that in case, multiple bars (e.g. stacked diode bars) may be used, since in this case the diode is not being imaged onto the grating, but supplying light to a laser cavity, in which light is coupled out through the individual fibers.

The bundle 100 includes a plurality of fibers 22A–22G. The fibers 22A–22G may be interconnected. The fibers 22A–22G are similar to the fiber 22. The grating of each fiber 22A–22G is a tilted grating. Each grating may be chirped or multiple-discrete. The bundle 100 with coupling gratings may be assembled into a composite assembly.

The device shown in FIG. 12 may meet the same angle and tilt condition as those of FIG. 2 to match the laser emission to the entrance angle of the gratings. The bundle 100 may be made up of a single continuous fiber loop, thereby further increasing efficiency.

The multiple wavelengths are now described in further detail. The approach described above is especially applicable to multiple wavelengths. By using broadband semiconductor gain media, for example, individual wavelengths can be selected by the design of grating, simplifying the requirements placed on the design of the semiconductor. In the case multiple wavelengths, the grating can be uniformly chirped or consist of discrete sections of constant wavelength. The grating can be formed by one continuous exposure, or made by multiple exposures using one or more masks. These types of gratings are described in Kashyap (chapter 3, section 3.1.11 to section 3.1.15).

Figure 13:
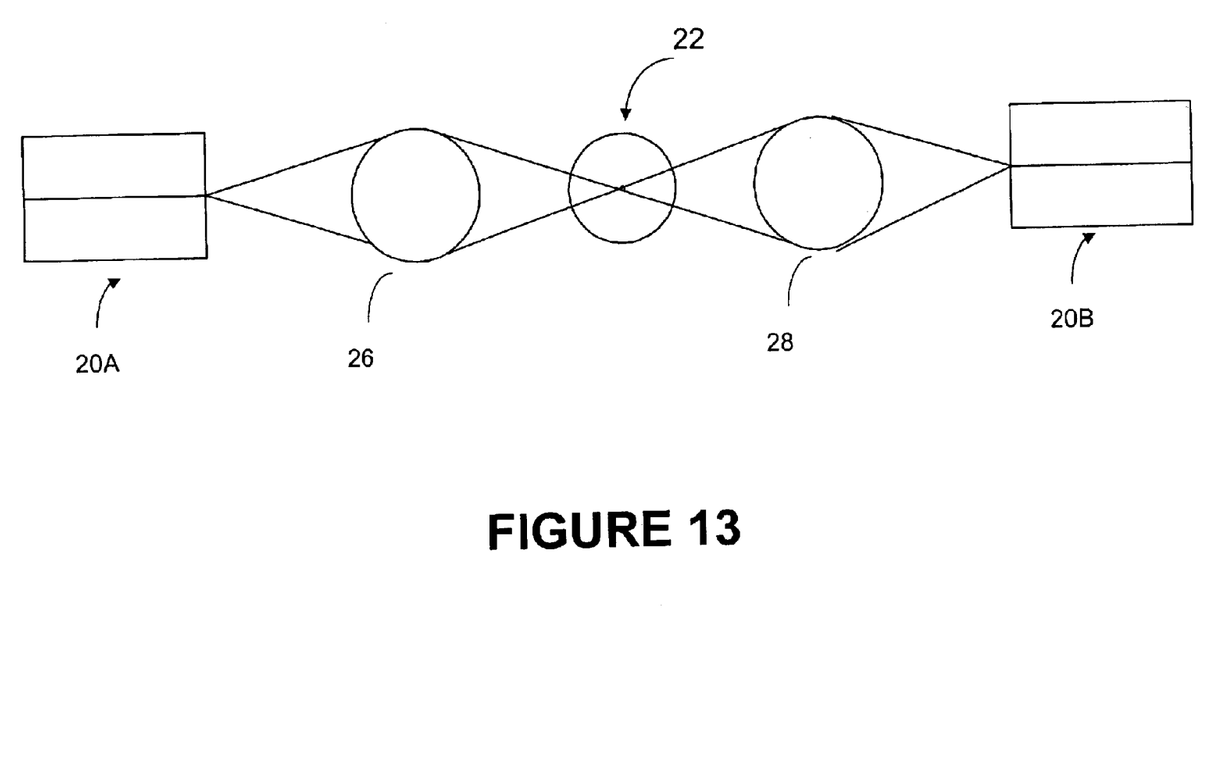
FIG. 13 is a schematic end-view diagram showing symmetrical configuration for the device of FIG. 2.

The configuration of the device shown in FIG. 2 is now described. The device of FIG. 2 may have a symmetrical configuration as illustrated in FIG. 13. In FIG. 13, laser diode bars 20A and 20B are symmetrically provided to the fiber 22, through coupling optics 26 and 28, respectively.

The device of FIG. 2 may have a ring (loop) configuration. The ring configuration is a well-known approach to laser design. The ring geometry is described in "High Power Side Pumped Unidirectional Ring Yb-Doped Double-Clad Fiber Laser", Hideur A. Chartier T. Sanchez S. Paper CThE50, European Conference on Lasers & Electro-Optics (CLEO/Europe), 10-Sep., 2000, Nice, France, (0-7803-6319-1) p. 317; and U.S. Pat. No. 5,623,508, "Article comprising a counter-pumped optical fiber Raman amplifier" Grubb, et al. Apr. 22, 1997.

Figure 14:
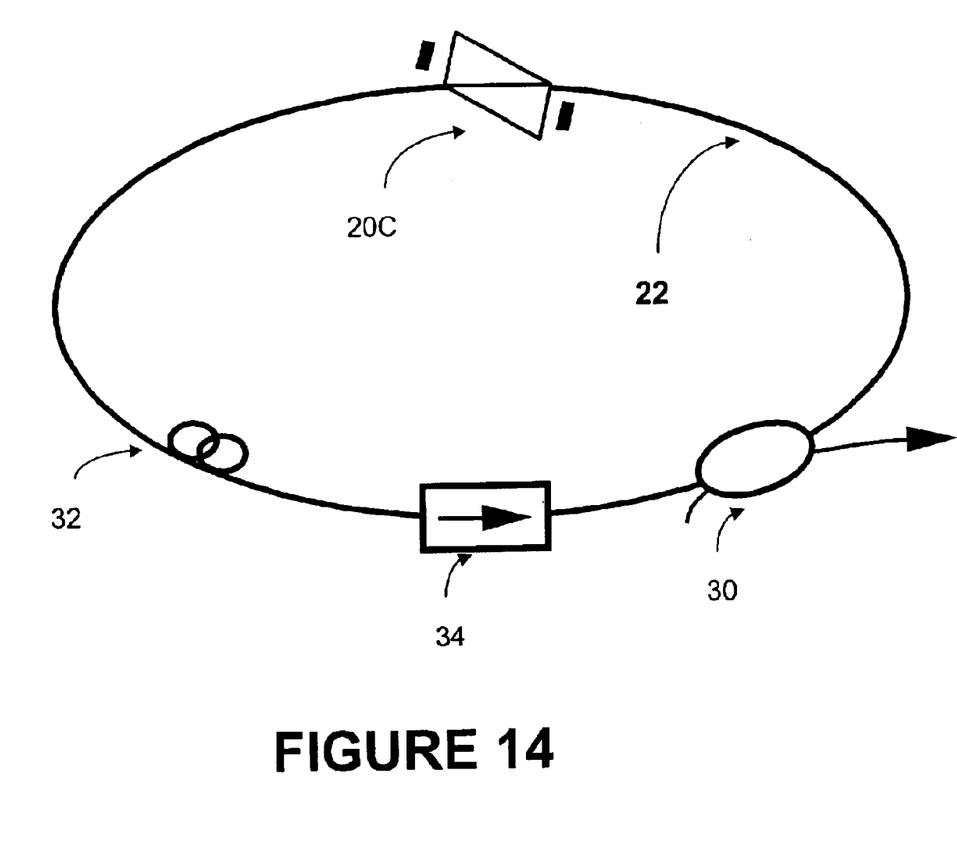
FIG. 14 is a schematic diagram showing loop configuration for the device of FIG. 2.

FIG. 14 shows one example of the ring configuration of the device of FIG. 2. The ring of FIG. 14 achieves noise suppression, including isolators for unidirectional operation or may be a symmetric construction. The device of FIG. 14 includes two sided pump lasers 20C and an output coupler 30 for coupling light in both directions for bi-directional operation. For bi-directional operation, the lasers 20C include a first laser and a second laser or mirror. For unidirectional operation, only one laser may be provided. The loop fiber shown in FIG. 14 may include a polarization controller 32 and a Farady_isolator 34 for unidirectional operation. The arrangement of FIG. 9 is also used in a ring, without the grating mirror 86 of FIG. 9.

The present invention lends itself to this approach in either unidirectional or bi-directional configuration. In the ring configuration, light propagates in both directions. In this case, the grating couples light into and out of both sides of the fiber with mirror symmetry. To account for this, a laser could be constructed with symmetrically placed optical sources on either side of the fiber, or one of the sources could be replaced by a mirror. Ring operation tends to average out noise.

The laser diode design is now described in further detail. For example, multiple stripe sources may be fabricated with a high reflector at one end of the fiber 22, and an anti-reflection, or curved stripe at the far output end of the fiber 22. The individual sources may operate as CW sources at the same, or different wavelengths. In addition, the sources may be pulsed or modulated. The sources may be close coupled to the fiber or coupled by optical elements.

The scaling is now described in detail. The approach in accordance with the embodiment of the present invention enables scaling of high power lasers to be coupled into a fiber. One or more large laser bars pumping multiple fibers (e.g. FIG. 12) is one example of the scaling. Further, the scaling also refers to the relationship among grating/laser/optics.

The device in accordance with the embodiment of the present invention may provide signals to communication systems, or provide light for micro-machine, cancer treatment (photodynamic therapy).

While particular embodiments of the present invention have been shown and described, changes and modifications may be made to such embodiments without departing from the true scope of the invention.

What is claimed is:

1. A device for coupling light comprising: a single mode optical fiber having a core and a cladding, said core including a low angle, tilted grating; and an optical source, which is optically coupled to the fiber, for directing light through the side surface of the fiber so as to couple the light into the core, wherein the fiber is a curved fiber for focusing directly onto the optical source.

2. A device for coupling light comprising: a single mode optical fiber having a core and a cladding, said core including a low angle, tilted grating; and an optical source, which is optically coupled to the fiber, for directing light through the side surface of the fiber so as to couple the light into the core, wherein the fiber includes more than one fiber, each of which has a low-angle, tilted grating.

3. A device for coupling light comprising:
   a fiber laser including;
   a single mode optical fiber having a core and a cladding, said core including a low angle, tilted grating; and an optical source, which is optically coupled to the fiber, for directing light through the side surface of the fiber so as to couple the light into the core, wherein the fiber laser has a loop configuration and the fiber laser further comprises an isolator for unidirectional operation.

4. A device for coupling light comprising: a single mode optical fiber having a core and a cladding, said core including a low angle, tilted grating; and an optical source, which is optically coupled to the fiber, for directing light through the side surface of the fiber so as to couple the light into the core, wherein the fiber further includes a grating for forming a downstream output coupler.

5. The device as claimed in claim 4, wherein the fiber further includes a section where rare-earth is inside a cavity, the section being located between the grating and the downstream grating.

6. The device as claimed in claim 5, wherein the gratings reflect light at a specific pump wavelength.

7. The device as claimed in claim 4, wherein the downstream output coupler is chirped or multiple-discrete to couple multiple wavelengths.

8. The device as claimed in claim 4, wherein the fiber has a gain medium.

9. The device as claimed in claim 4, wherein the fiber further includes a filter for defining multiple wavelengths as desired wavelengths and spacing.

10. The device as claimed in claim 4, wherein the fiber further includes a filter for outputting a constant amplitude signal as a function of wavelength.

11. A device for coupling light comprising an optical fiber having a core and a cladding, wherein the fiber includes a grating; and, an optical source, which is optically coupled to the fiber, for directing light through a surface of the fiber so as to couple the light into the core, wherein the fiber includes a first reflector, and wherein a laser cavity is formed between the optical source and the first reflector, and wherein the grating is disposed within the laser cavity.

12. A device for coupling light as defined in claim 11, wherein the grating is a low angle tilted grating, and wherein the grating directs light between the optical source and the reflector.

13. A device for coupling light as defined in claim 12, wherein the optical source is a laser diode having a facet which forms a second reflector of the laser cavity.

* * * * *